United States Patent

[11] 3,571,953

[72] Inventor  Frank Sylvester Hassell, Jr.
              Marshall, Va.
[21] Appl. No. 788,785
[22] Filed     Jan. 3, 1969
[45] Patented  Mar. 23, 1971
[73] Assignee  Acne Fund, Frank S. Hassel, Jr., sole administrator

[54] MULTIPLICATION GAME
     9 Claims, 4 Drawing Figs.
[52] U.S. Cl. .................................................. 35/31
[51] Int. Cl. ............................................ G09b 19/02
[50] Field of Search ........................................... 35/31, 31.4, 31.6, 31.8; 33/111

[56]        References Cited
         UNITED STATES PATENTS
   438,757  10/1890  Bliss ............................  35/31(.6)
 1,402,807   1/1922  Tegtmeyer et al. .............  35/31(.6)
 2,899,756   8/1959  Wise ............................  35/31(.6)
 2,926,432   3/1960  Helberg .........................  35/31
         FOREIGN PATENTS
    19,238   4/1899  Switzerland ..................  35/31

Primary Examiner—William H. Grieb

ABSTRACT: This game is an aid in the learning of the multiplication tables, comprising a yardstick marked on one side with problems and the other with answers to tables 1 through 9 with corresponding numbers on tabs, approximately one-half being of different color.

| 1 | 2 | 3 | TWO 4 | 5 | TWO 6 |

| 7 | TWO 8 | TWO 9 | 10 | TWO 12 | 14 |

| 15 | TWO 16 | TWO 18 | 20 | 21 | TWO 24 |

| 25 | 27 | 28 | 30 | 32 | 35 |

| TWO 36 | 40 | 42 | 45 | 48 | 49 |

| 54 | 56 | 63 | 64 | 72 | 81 |

MULTIPLICATION GAME

MULTIPLICATION GAME

This invention pertains to a new and novel multiplication game intended to enable its players to memorize their multiplication tables while playing it without any conscious effort to do so.

Some children have difficulty in memorizing the multiplication tables. There are so many different numbers and it is so easy to get them confused. In the multiplication tables 1 through 9, there are a total of 81 different problems. But what most children don't realize is there are many duplicate answers—only 36 different answers for all 81 problems.

Flash cards, wherein the problem is placed on one side of a card and the answer on the reverse side are helpful to many children. However, flash cards have several drawbacks: There is no real game involved in using them. There is no fixed point-of-reference for each answer or for each problem to aid in learning it. Flash cards are too direct an approach for those who have emotional blocks against memorizing the multiplication tables.

Other multiplication games are too expensive for the poor students, too complicated (or too many numbers) for the slow learner, or do not utilize the reverse psychology of learning——we learn not only by learning answers to problems but also by learning problems to answers.

The objects of this invention are to overcome these various shortcomings by making the game interesting and exciting by rewarding both speed and accuracy, by arranging the answers in numerical order on a yardstick, a folding yardstick, or three 1-foot rulers to facilitate association of the answer or of the problem with fixed points-of-reference on the yardstick or rulers, to make it possible for players to figure out their answers by various processes of deduction and association without necessarily relying only upon rote memory, to provide a game that is so inexpensive, even the poorest pupils (or their teachers) can afford it, to make it so simple and with such an economy of numbers that even the slow learner can benefit from it, and to fully utilize the reverse psychology of learning by providing two games in one—the answer game and the problem game.

In the drawings:

FIG. 1 shows one side—the problem side—of the yardstick or rulers (divided into six pieces).

FIG. 2 shows the reverse side—the answer side—of the yardstick or rulers (divided into six pieces).

FIG. 3 represents a problem tab.

FIG. 4 represents an answer tab.

Referring to the drawings in FIG. 2, 10 represents the first part of the yardstick or rulers and 11 represents the last part. 12 represents the answers printed on the yardstick or rulers. 13 refers to the "two" written in the blocks of those answers that have two tabs—two different problems with the same answer.

Figure 1:
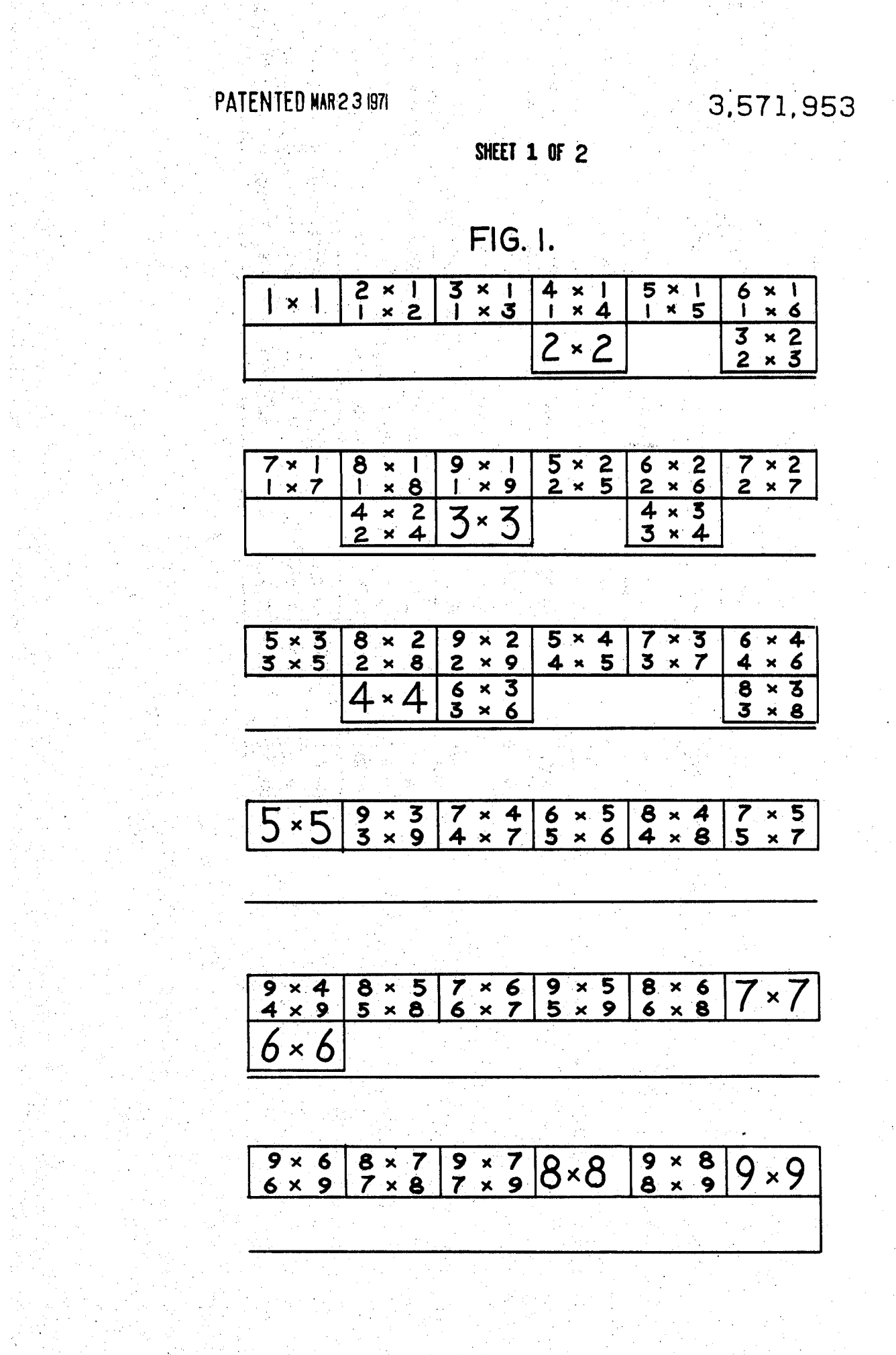

In accomplishing the objects of all the 36 answers, FIG. 2, of the multiplication tables 1 through 9 are printed at 1-inch intervals on one side of a yardstick or three 1-foot rulers, the answers starting with 1 and ending with 81. On the reverse side of the yardstick or the rulers, FIG. 1, are grouped all the problems having a common answer, printed on the back of the appropriate answer. A tab for each answer, FIG. 4, is cut out of cardboard, plastic, or other material, the shape of which is readily distinguishable from the shape of each problem tab, FIG. 3. One-half of the 36 tabs with the answers printed on them are of one color for one player and the other half of another color for the other player. Similarly, approximately one-half of the 45 tabs with the problems printed on them are of one color and the balance of another color.

Before playing, the tabs are "poured" from one hand to the other to mix them up. Then tabs are held in one hand until played with the other hand. In the problem game, the problem tabs are placed by the two players on the appropriate printed answers. In the answer game, the answer tabs are placed by the two players on the appropriate printed problems. The game is over as soon as one player finishes. The tabs are gently slid off the yardstick or each ruler, broadside, along a flat surface, the yardstick or rulers turned over and placed alongside the tabs and immediately compared to determine who is the winner by having the most correct.

A folding yardstick consisting of three 1-foot rulers braded at connecting ends is considered more practical than the yardstick for the greatest number of potential users due to limited space in the classrooms and in some homes and the possibility of accidental injuries with the yardstick while carrying it from place to place.

Whereas this invention has been illustrated and described in specific terms, it should be understood that the illustrations and descriptions have been made only by way of example and not as limitations of the scope of the invention as set forth herein and in the following claims.

I claim:

1. A new and novel apparatus, a multiplication game, to aid in the learning of the multiplication tables comprising:

a yardstick or three 1-foot rulers on one side of which is marked in numerical order all the 36 answers to all the multiplication problems, tables 1 through 9, and on the reverse side of which are grouped all the problems having a common answer marked directly back of each said answer;

a first set of 36 tabs, each of which has marked on it one of the 36 answers to problems, multiplication tables 1 through 9, half of which are of one color and the other half of another color;

a second set of 45 tabs of a distinctive shape to distinguish it readily from the first set of 36 tabs, each of which has marked on it one of the 45 problems, multiplication tables 1 through 9, counting a problem that is reversed with the same answer as one problem (e.g. 2×5 and 5×2), approximately one-half of which are of one color and the balance of another color.

2. The invention described in claim 1 wherein the folding yardstick, yardstick, or rulers may be made of any appropriate material, such as wood, plastic, or metal, made of a material that can be rolled or folded, such as cloth or a manmade fabric, or may be printed or otherwise marked on one or more sheets of paper, cardboard or other material.

3. The invention described in claim 1 wherein the folding yardstick, yardstick, or rulers may be divided into two or more sections.

4. The invention described in claim 1 wherein the overall length may be reduced or increased from the 36 inches illustrated.

5. The invention described in claim 1 wherein the number of problems may be reduced, such as eliminating the first multiplication table, or may be increased, such as adding tables 10, 11, and 12.

6. The invention described in claim 1 wherein the tabs may have a sticky surface, such as that of masking tape, and be temporarily stuck on the stick or ruler until checked by revolving it.

7. The invention described in claim 1 wherein the problems printed on the reverse side of the answers would be so faced that when the stick or ruler is revolved, numbers will be right side up instead of upside down.

8. The invention described in claim 1 wherein the double problem e.g. 5×1 and 1×5 may be shown one way on the stick e.g. 5×1 and the other way on the tabs, e.g. 1×5 to simplify both.

9. The invention described in claim 1 wherein every other number is colored one color to correspond with the tabs of that color for one player and similarly for another color and another player to facilitate playing.